United States Patent Office 2,901,481
Patented Aug. 25, 1959

2,901,481

PROCESS FOR PREPARING DIALKYLDITHIO-PHOSPHORIC ACID ESTER DERIVATIVES HAVING TWO AMIDE GROUPS IN THE MOLECULE AND THE INSECTICIDAL COMPOUNDS OBTAINED THEREBY

Raffaello Fusco, Giuseppe Losco and Mario Perini, Milan, Italy, assignors to Montecatini-Societa Generale per l'Industria Mineraria e Chimica, a corporation of Italy No Drawing. Application July 10, 1956
Serial No. 596,845

Claims priority, application Italy July 14, 1955

3 Claims. (Cl. 260—268)

The present invention relates to a new type of compounds deriving from a diamine, whereby amide linkages bind the two basic groups to identical dialkyldithiophosphoryl acetic acid radicals. Moreover, the invention relates to the process of preparing these compounds and to their use as insecticides.

These compounds may be defined by the structural formula

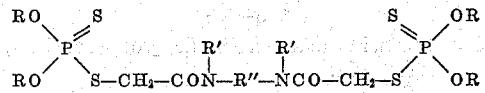

wherein R represents a lower alkyl, R' represents hydrogen or may be absent, R'' represents an aliphatic chain (such as —CH$_2$—, —CH$_2$—CH$_2$—, —(CH$_2$)$_n$—) or, if R' is absent, two aliphatic chains forming with the two nitrogen atoms a ring, such as

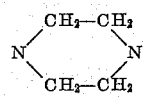

or an aromatic nucleus, such as

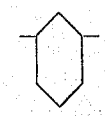

or a mixed aliphatic-aromatic chain, such as

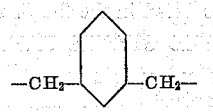

The products of the present invention can be prepared by reacting one mol of a bis-chloroacetamide of a diamine of the general formula

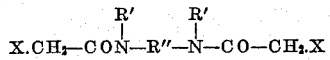

wherein X represents a halogen, with two mols of a phosphate of the general formula

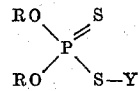

wherein Y represents an alkali metal or ammonium.

The synthesis scheme is therefore the following:

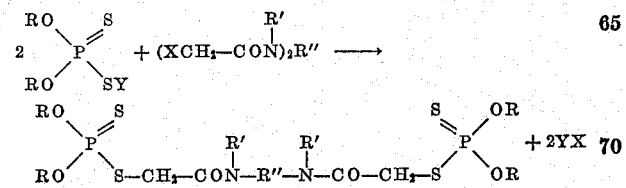

A modification of the process consists in using, instead of said phosphate, the corresponding acid phosphate and a basic compound of the metal which is sufficiently alkaline to neutralize the acid phosphate (for example, Na$_2$CO$_3$, K$_2$CO$_3$, KOH, NaOH, etc.).

The reaction is carried out in the presence of a solvent for either or both reactants. Water, alcohols, ketones, ethers, esters, dioxane and aromatic hydrocarbons can be used as solvents.

EXAMPLE 1

40 g. pure diethyldithiophosphoric acid dissolved in 200 cc. acetone are neutralized with 12 g. anhydrous sodium carbonate and to the solution thus obtained 21 g. of bis-ethylenediamide of monochloroacetic acid are added in small quantities while stirring. The mixture is stirred for 2 hours. After standing overnight, the mixture is refluxed for 3 hours while stirring, and the solvent is distilled off by heating on a boiling water bath. The residue is cooled, treated with water and stirred for half an hour. The mixture is then filtered by suction. 34 g. of a product, M.P. 89–92° C., are obtained. Upon crystallization from 70% methanol, beautiful crystals are obtained, M.P. 103–105° C. The analysis agrees with the formula

(C$_2$H$_5$O)$_2$PSS—CH$_2$—CONH—CH$_2$—CH$_2$—NHCO—CH$_2$—SPS(OC$_2$H$_5$)$_2$

EXAMPLE 2

41 g. diethyldithiophosphoric acid, dissolved in 170 cc. acetone, are neutralized with 11.6 g. potassium carbonate. The mass is stirred for half an hour and 23.9 g. of bis-piperazide of monochloroacetic acid are added. After standing overnight, the mixture is refluxed for one hour and the acetone is distilled off on a boiling water bath. The residue is cooled and treated with water. An oil is separated which crystallizes upon rubbing the wall of the container. The crystalline precipitate is ground with a NaHCO$_3$ solution and the mass obtained is filtered by suction. 34 g. of a white powder, M.P. 75–77° C., are obtained. Upon crystallization from 70% methanol, crystals are obtained, M.P. 88–89° C.

The analysis agrees with the formula

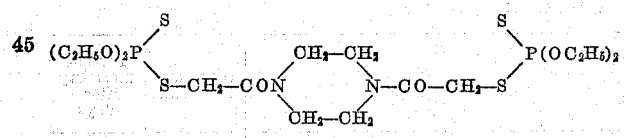

Products defined by the herein claimed general formula have proved to possess important insecticidal properties which make them suitable for a practical use in parasite control.

The following examples are presented to illustrate these properties:

*Musca domestica*

After topical application, by means of a micro-syringe, of acetone solutions of the compounds under examination to five days old flies, the following average per cent mortalities were obtained after 20 hours:

| γ/fly | 50 | 10 | 2 | 0.4 |
|---|---|---|---|---|
| | Percent mortality after 20 hours | | | |
| Ethylenediamide of O,O-diethyldithiophosphorylacetic acid | 16 | 5 | 0 | |

After tarsal absorption, by introducing five days old female flies into beakers previously treated with controlled amounts of benzene solutions of the active substances under examination, and leaving the flies in contact with these substances for 20 hours, the following mortalities were observed:

|  | g./m.² | Percent mortality after 20 hours |
|---|---|---|
| Ethylenediamide of O,O-diethyldithiophosphorylacetic acid | 0.125 | 21 |
| Piperazide of O,O-diethyldithiophosphorylacetic acid | 0.125 | 2 |

*Aphis fabae*

By spraying a population of aphides, apterous virginoparous females, on bean plants under standardized conditions with suitably formulated aqueous dispersions of the substances under examination, the following average mortalities were obtained after 24 hours:

|  | conc. percent A.S. | Percent mortality after 24 hours |
|---|---|---|
| Ethylenediamide of O,O-diethyldithiophosphorylacetic acid | 0.5 | 100 |
|  | 0.1 | 45 |
| Piperazide of O,O-diethyldithiophosphorylacetic acid | 0.5 | 35 |
|  | 0.1 | 4 |

*Tetranychus telarius*

By spraying a mixed population of mites in various stages of growth on bean plants under standardized conditions with suitably formulated aqueous dispersions of the substances under examination, the following average mortalities were obtained after 24 hours:

|  | conc. percent A.S. | Percent mortality after 24 hours |
|---|---|---|
| Ethylenediamide of O,O-diethyldithiophosphorylacetic acid | 0.1 | 100 |
|  | 0.02 | 99 |
|  | 0.008 | 70 |
| Piperazide of O,O-diethyldithiophosphorylacetic acid | 0.5 | 95 |
|  | 0.1 | 50 |
|  | 0.02 | 5 |

Spraying of mite eggs gave the following average mortalities:

|  | conc. percent A.S. | Percent mortality after 6 days |
|---|---|---|
| Ethylenediamide of O,O-diethyldithiophosphorylacetic acid | 0.5 | 100 |
|  | 0.25 | 90 |
|  | 0.125 | 75 |
|  | 0.063 | 30 |
| Piperazide of O,O-diethyldithiophosphorylacetic acid | 0.5 | 10 |
|  | 0.25 | 0 |

Moreover, the DL 95 was determined by the same technique for the various applications for the ethylenediamine of O,O-diethyldithiophosphorylacetic acid:

*Aphis fabae*—DL 95 in percent A.S. ____ 0.3
*Tetranychus telarius*—DL 95 in percent A.S. ____ 0.015
Eggs of *T. telarius*—DL 95 in percent A.S. ____ 0.3

*Determination of the acute toxicity per os of one of the compounds of this application*

The acute toxicity per os was determined and compared with that of Parathion by gastric sounding and administration of solutions of the products under examination in dimethylacetamide to white mice (size 18/20 g.). The solvent interference with the toxic phenomena is negligible.

DL 50 in mg./kg.
Parathion ____ 8.2
Ethylenediamide of O,O-diethyldithiophosphorylacetic acid ____ 123.1

We claim:
1. The insecticide of the formula

$(C_2H_5O)_2PSS—CH_2—CONH—CH_2—CH_2—NHCO—CH_2—SPS(OC_2H_5)_2$

2. The insecticide of the formula

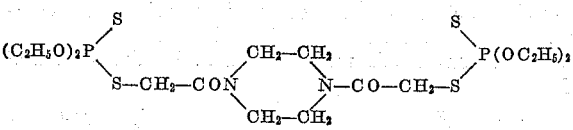

3. An insecticide taken from the group consisting of those of the formula:

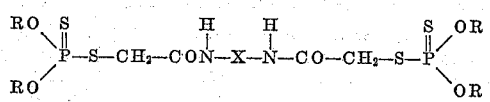

and those of the formula:

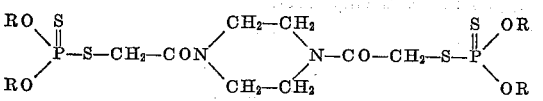

in which respective formulae R is a number of the group consisting of methyl and ethyl, and X is a bridging group taken from the class consisting of $—CH_2$, $—CH_2—CH_2—$, the phenylene radical $—C_6H_4—$, the mixed aliphatic-aromatic chain $—CH_2—C_6—H_4—CH_2—$ References Cited in the file of this patent
UNITED STATES PATENTS

| 2,494,283 | Cassaday et al. | Jan. 10, 1950 |
| 2,586,656 | Hook et al. | Feb. 19, 1952 |